United States Patent
Schumacher

(10) Patent No.: US 6,450,121 B1
(45) Date of Patent: Sep. 17, 2002

(54) DEVICE FOR COMPENSATING THE PRESSURE OF A LIQUID AND METHOD FOR CHANGING THE PRESSURE COMPENSATION RATIO

(75) Inventor: Egon Schumacher, Barnstorf (DE)

(73) Assignee: Lubing Maschinenfabrik Ludwig Bening GmbH & Co. KG, Barnstorff (DE)

( * ) Notice: Subject to any disclaimer, the term of this patent is extended or adjusted under 35 U.S.C. 154(b) by 0 days.

(21) Appl. No.: 09/705,485

(22) Filed: Nov. 3, 2000

(30) Foreign Application Priority Data

Nov. 8, 1999 (DE) .......................... 199 53 656

(51) Int. Cl.[7] .................................. A01K 7/00
(52) U.S. Cl. ........................................ 119/72
(58) Field of Search ............... 119/72, 79, 80; 137/256, 262, 527.8, 532, 533

(56) References Cited

U.S. PATENT DOCUMENTS

| | | | |
|---|---|---|---|
| 1,526,249 A | * 2/1925 | Smith ........................... | 119/79 |
| 1,622,069 A | * 3/1927 | Thomson et al. ............. | 137/532 |
| 1,870,927 A | * 8/1932 | Schoene ....................... | 137/533 |
| 4,297,846 A | * 11/1981 | Cadeddu ...................... | 137/262 |
| 5,036,881 A | 8/1991 | Southmayd ................... | 137/533.29 |
| 5,184,571 A | 2/1993 | Hostetler ...................... | 119/72 |
| 5,429,072 A | * 7/1995 | Schumacher ................. | 119/72 |
| 5,870,970 A | 2/1999 | Katz ............................. | 119/72 |
| 6,009,894 A | * 1/2000 | Trussart ....................... | 137/527.8 |
| 6,164,311 A | * 12/2000 | Momont et al. .............. | 119/72 |

FOREIGN PATENT DOCUMENTS

| | | |
|---|---|---|
| DE | 25 43 319 A1 | 4/1977 |
| DE | 42 15 013 A1 | 11/1992 |

* cited by examiner

*Primary Examiner*—Peter M. Poon
*Assistant Examiner*—Elizabeth Shaw
(74) *Attorney, Agent, or Firm*—Technoprop Colton LLC

(57) ABSTRACT

In the gradient controller according to the invention, the value arrangement (32) has a valve pin (33) closing as a result of its own weight. Springs are therefore unnecessary. The valve pin (34) can be guided directionally so as to be capable of being moved up and down, thus ensuring that the gradient controller has a high degree of reliability.

Also provided is an insert part (37) which can be taken out of the gradient controller and in which the valve pin (34) is capable of being moved up and down and is secured against falling out. The insert part (37) and the valve pin (34) thereby form a unit which can be taken as a whole out of the gradient controller, specifically both for maintenance purposes and for exchanging the valve pin (34) for one with a different weight, with the result that it is possible in a simple way to change the pressure compensation ratio of the gradient controller.

26 Claims, 5 Drawing Sheets

DEVICE FOR COMPENSATING THE PRESSURE OF A LIQUID AND METHOD FOR CHANGING THE PRESSURE COMPENSATION RATIO

BACKGROUND OF THE INVENTION

1. Technical Field

The invention relates to a device for compensating the pressure of a liquid in a liquid conduit of an animal drinking trough with a housing which is capable of being inserted into the liquid conduit and in which chambers for inflowing liquid and for outflowing liquid are located, at least one valve arrangement being arranged between the chambers separated by a partition. The invention relates, furthermore, to a method for changing the pressure compensation ratio, in particular of a device for compensating the pressure in a liquid conduit, according to the pressure of the inflowing liquid being changed to a lower pressure for outflowing liquid by means of a valve arrangement having a valve body.

2. Prior Art

Devices of the type referred to here are designated in the specialized jargon as gradient controllers. They are preferably used along inclined liquid conduits for feeding drinking nipples for animals, for example poultry. In the case of inclined liquid conduits, the pressure rises along these. The gradient controllers serve for equalizing the pressure along the inclined liquid conduit.

There are known gradient controllers having a valve arrangement which possesses a spring-loaded valve body. The springs necessary for this purpose often present problems in practice. For example, over a period of time, the springs may fail due to a fracture. The known gradient controllers therefore operate only unreliably.

BRIEF SUMMARY OF THE INVENTION

Proceeding from this, the object on which the invention is based is to provide a device (gradient controller) and a method of the type mentioned in the introduction, by which the pressure along inclined liquid conduits can be adapted according to the conditions in a simple and reliable way.

A device for achieving this object has the features of claim 1. Since the valve arrangement possesses a preferably cylindrical valve pin which closes as a result of its own weight, the spring necessary in the known gradient controllers or gradient pressure controllers may be dispensed with. Moreover, the valve pin ensures that the valve arrangement opens and closes reliably, because said pin, by virtue of its preferably cylindrical shape, can be guided reliably so as to be capable of being moved up and down.

There is provision, furthermore, for assigning the valve arrangement to a chamber for outflowing liquid. The valve pin can thereby by arranged vertically above the chamber of the inflowing liquid. As a result of this, the valve pin capable of being moved up and down can, by its own weight, close the valve arrangement.

According to a preferred embodiment of the invention, the valve pin is provided, preferably on its underside, with a conical, in particular frustoconical, sealing surface. This frustoconical sealing surface matches a likewise conically, in particular frustoconically formed valve seat. A reliable seal is therefore ensured when the sealing surface of the valve pin rests on the valve seat. A gravity-induced reliable closing of the valve arrangement is ensured as a result, specifically even in the case of small valve pins which have only a low own weight.

According to a preferred embodiment of the invention, the guide for the valve pin is longer than the length of the latter. As a result, for scavenging the liquid conduit, the valve pin can be moved sufficiently far away from the valve seat. The gradient controller according to the invention consequently allows unimpeded scavenging of the drinking appliance.

There is provision, furthermore, for providing the guide for the valve pin in sleeve-like insert part which is arranged in a matching sleeve of the housing. Thus, by means of the insert part, the valve pin of the valve arrangement can be taken out of the gradient controller sleeve arranged on the housing, for example in order to clean the valve arrangement. So that the insert part, together with the valve pin, can be mounted and demounted, the valve pin is secured in the insert part against falling out. Preferably, for this purpose, the insert part has spring tongues which, by virtue of elastic deformation, make it possible to separate the valve pin from the insert part when the latter is to be exchanged.

A method for achieving the object mentioned in the introduction has the measures of claim 20. Accordingly, the valve arrangement is provided with valve bodies of different own weight, in order to change the pressure compensation ratio of the gradient controller. In the case of a comparatively heavy valve body, the gradient controller brings about a greater pressure difference between the inflowing liquid and the outflowing liquid. Conversely, a lighter valve body leads to a smaller pressure difference in the chambers connected by means of the valve arrangement.

In the preferred method, the valve body is exchanged together with the insert part. The insert part arranged in the housing of the gradient controller so as to be capable of being pulled out can easily be mounted and demounted. Alternatively, it is also possible to pull the insert part, together with the valve body, out of the sleeve of the housing and, with the insert part demounted, to exchange the valve body by the latter being separated from the insert part and replaced by a new valve body, in particular a valve pin. The same insert part may always be used when, according to a preferred embodiment of the invention, the different valve bodies or valve pins do not differ in diameter, but only in length.

BRIEF SUMMARY OF THE FIGURES

A preferred exemplary embodiment of the invention and the method according to the invention are explained in more detail below with reference to the drawing in which.

DETAILED DESCRIPTION OF THE PREFERRED EMBODIMENTS

The device show here is a gradient controller or gradient pressure controller of a drinking appliance for animals, in particular poultry. The drinking appliance serves for supplying the animals with a liquid, in particular water, which, if appropriate, may contain additives, such as, for example, drugs.

The drinking appliance, otherwise not shown in the figures, is arranged, suspended, in a stable for accommodating the animals. The drinking appliance has an elongate water supply conduit running through the stable and having a, for example, square cross section with rounded corners. Arranged at the water inlet of the water supply conduit is a pressure reducer which reduces the water pressure of a water feed conduit to the operating pressure of the drinking appliance. Drinking valves are arranged at regular intervals along the water supply conduit. By appropriately actuating the drinking valves, the animals can obtain by themselves the amount of water which they require.

The water supply conduit often runs at a slight inclination to the horizontal. This occurs, in particular, when, for reasons of geography, a stable is erected on sloping ground or the water supply conduit has an artificial gradient to make cleaning simpler. In such water supply conduits running at a downward inclination from the water feed, the pressure along these rises continuously. The device according to the invention serves for equalizing the water pressure in such water supply conduits running at an inclination. As a rule, a plurality of such devices are arranged at uniform intervals along the water supply conduit. Such a drinking appliance is known, for example, from U.S. Pat. No. 5,870,970. Reference is made to this with regard to the basic make-up of the drinking appliance. Here, too, a plurality of gradient controllers, so-called "pressure regulators", are arranged along the inclined water supply conduit. The device according to the invention is a further development or modification of the "pressure regulators" known from U.S. Pat. No. 5,870,970.

Figure 2:
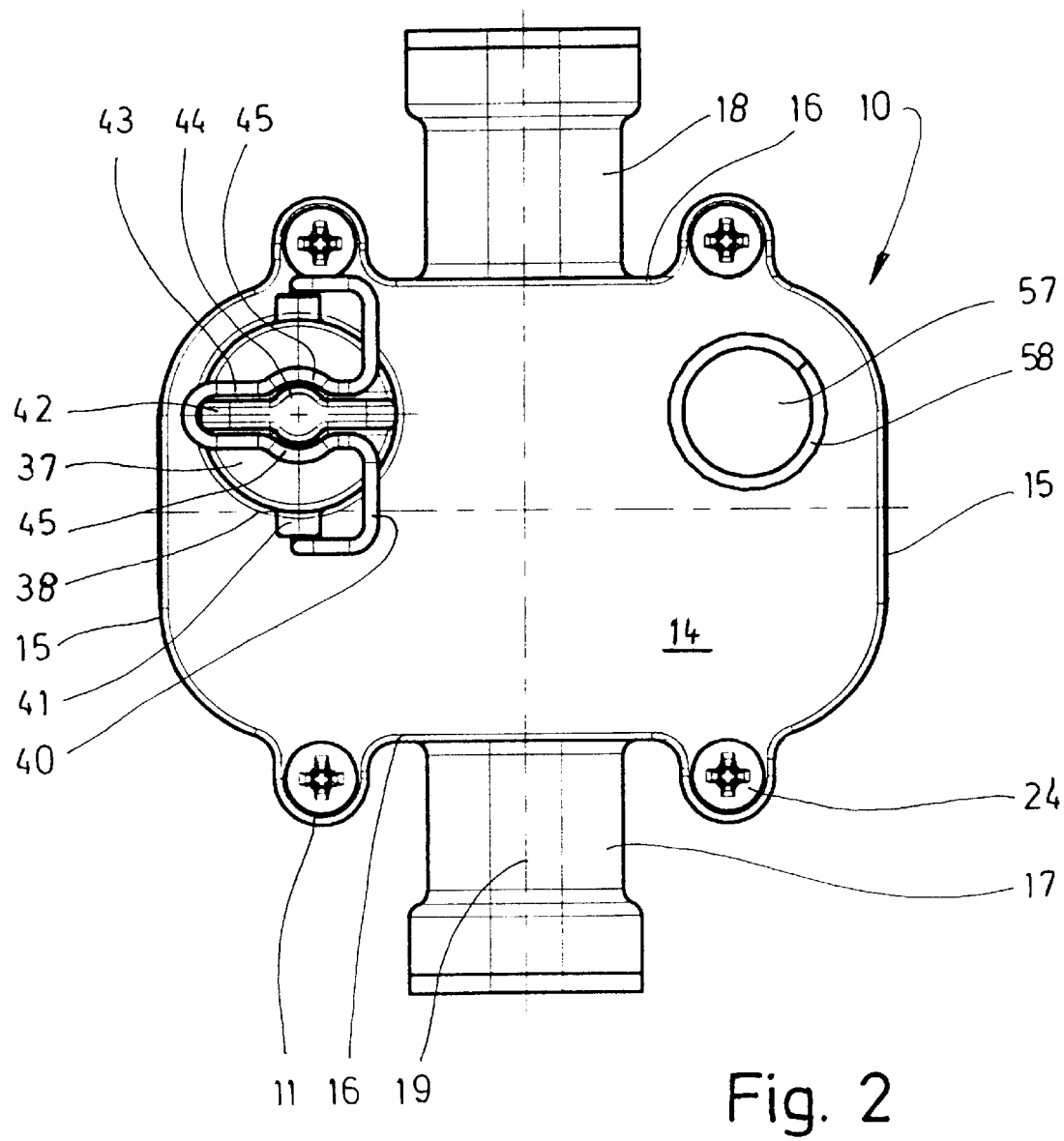
FIG. 2 shows a top view of the device of FIG. 1.
Figure 3:
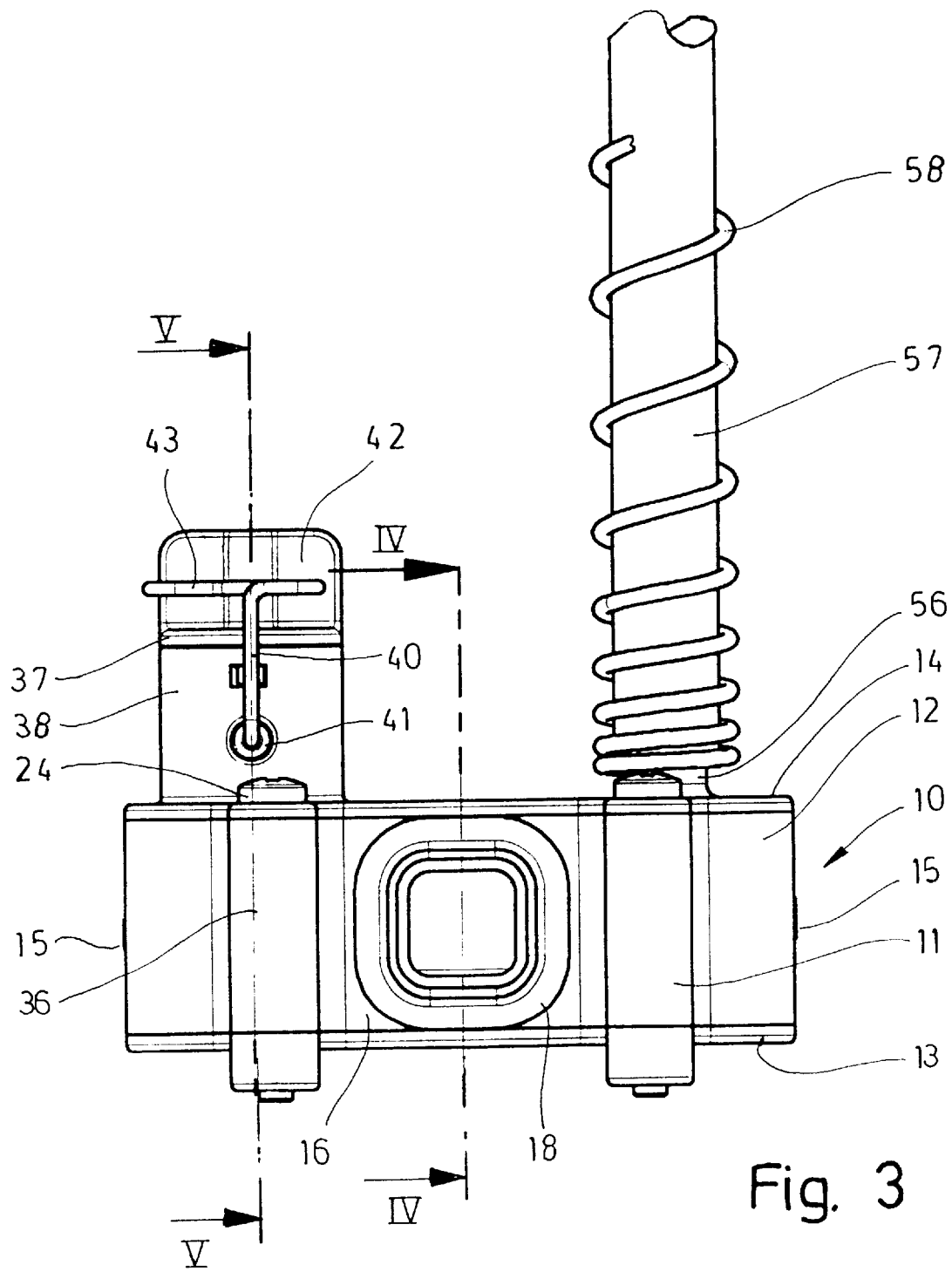
FIG. 3 shows a side view, looking towards a water inflow.

In the exemplary embodiment shown here, the device has a box-shaped housing 10 with an essentially rectangular base (FIG. 2). The housing 10 is formed from plastic. Opposite sides of the housing 10 have in each case two outwardly projecting protuberances 11.

Figure 4:
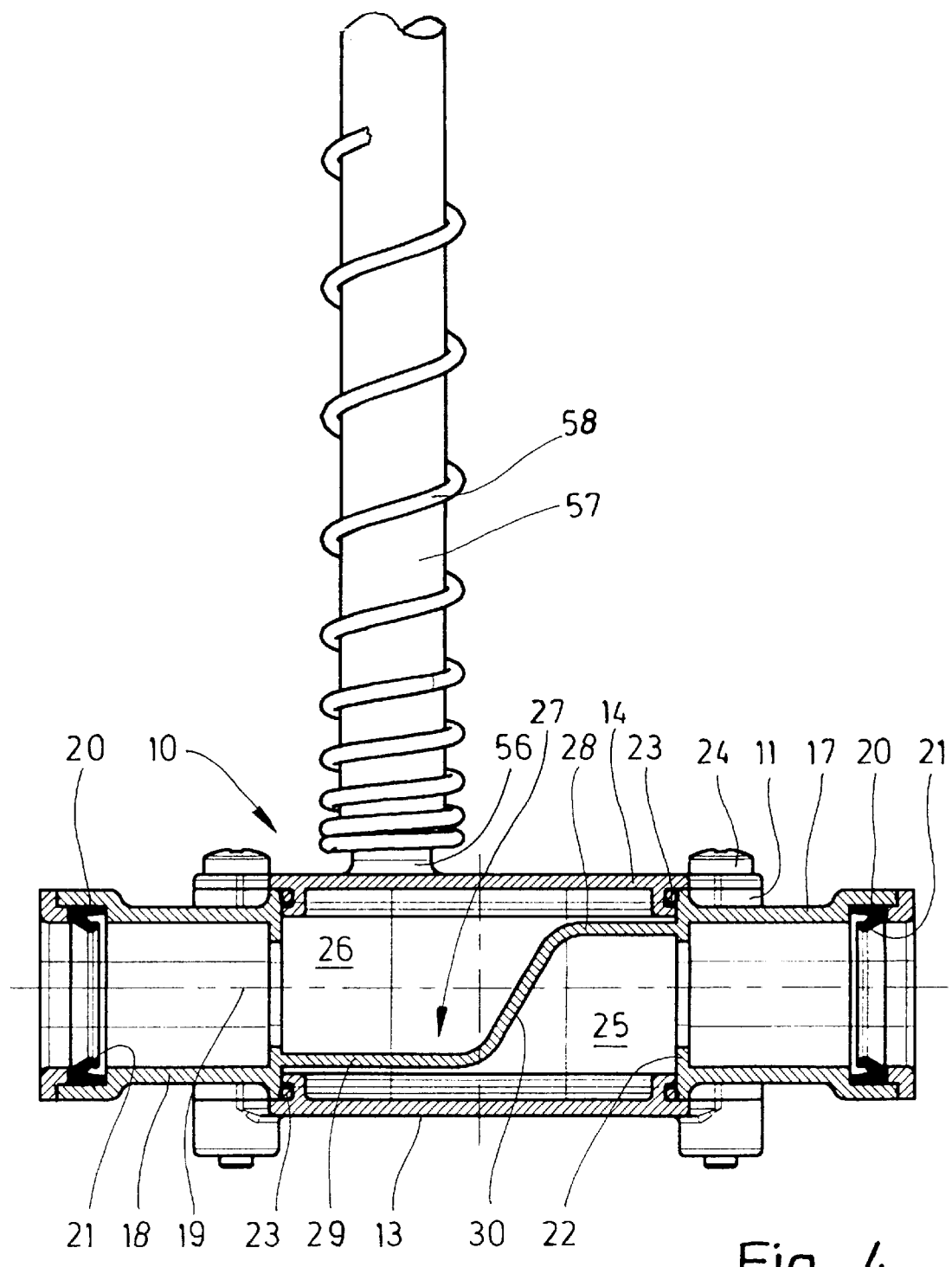
FIG. 4 shows a section IV—IV through the device.

The housing 10 has a multi-part design. It is composed of a housing middle part 12 of a lower plane bottom plate 13 and of an upper likewise plane cover plate 14. The housing middle part 12 is surrounded by a continuous vertical side wall which is composed of two parallel longitudinal side walls 15 and of two parallel transverse side walls 16. One transverse side wall 16 is assigned a water inflow connection piece 17, whilst the opposite transverse side wall 16 has a water outflow connection piece 18. The water inflow connection piece 17 and the water outflow connection piece 18 lie on a common axis, to be precise the longitudinal mid-axis 19 of the housing 10. The water inflow connection piece 17 and the water outflow connection plate 18 each have a square inner cross section of the same size or area, which matches the outer cross section of the water supply conduit. A seal 20 with a continuous elastically deformable sealing lip 21 is arranged inside the water inflow connection piece 17 and the water outflow connection piece 18 at a distance from the outer end in each case (FIG. 4).

The device can be inserted into the water supply conduit. The water supply conduit is separated where the device is to be arranged under given pressure conditions. At the separating point, a short portion of the water supply conduit is removed, so as to allow for, between the mutually confronting ends of the water supply conduit, a clearance which allows the device to be arranged between these ends of the separated water supply conduit. The device is connected to the water supply conduit by a short end region being pushed in each case into the water inflow connection piece 17 and the water outflow connection piece 18 at the separating point of the water supply conduit. The depth to which the respective portion of the water supply conduit is pushed into the water inflow connection piece 17 and the water outflow connection piece 18 is limited by a continuous collar 22 at that end of the water inflow connection piece 17 and of the water outflow connection piece 18 which faces the inside of the housing 10. This collar 22 thereby slightly contracts the inner cross section of the water inflow connection piece 17 and of the water outflow connection piece 18, specifically approximately to the inner free cross section of the water supply conduit. The end regions of the water supply conduit which are pushed into the water inflow connection piece 17 and the water outflow connection piece 18 are sealed off relative to the housing 10 by means of the seals 20.

Upper and lower open end faces of the housing middle part 12 are covered by the bottom plate 13 and the cover plate 14. These come to rest respectively under and on the end faces of the longitudinal side walls 15 and of the transverse side walls 16 of the housing middle part 12. By means of a continuous seal 23 assigned in each case to the bottom plate 13 and to the cover plate 14, the bottom plate 13 and the cover plate 14 are sealed off, water-tight, relative to the housing middle part 12. The bottom plate 13 and the cover plate 14 are connected to the housing middle part 12 by means of screws 24 which are screwed from outside through the bottom plate 13 and the cover plate 14 into the protuberances 11 of the housing middle part 12.

Located inside the housing 10 is a partition 27. The latter subdivides the interior of the housing 10 into two chambers 25 and 26. The water inflow connection piece 17 issues into the lower chamber 25. The inflowing water thereby flows into the lower chamber 25. The upper chamber 26 is connected to the water outflow connection piece 18, so that water can flow out through the upper chamber 26 and through the water outflow connection piece 18. The partition 27 is angled twice along its run between the water inflow connection piece 17 and the water outflow connection piece 18. For this purpose, the partition 27 has a horizontal edge portion 28 lying above the water inflow connection piece 17 and a likewise horizontal edge portion 29 lying below the water outflow connection piece 18. The edge portions 28 and 29 lying in different horizontal planes are connected by means of an obliquely directed middle portion 30 of the partition 27. The middle portion 30 is somewhat offset laterally, that is to say is arranged eccentrically in the housing 10. As a result, the edge portion 29 lying below the water outflow connection piece 18 has a greater length than the edge portion 28 arranged at a higher level on the other side of the middle portion 30.

Figure 5:
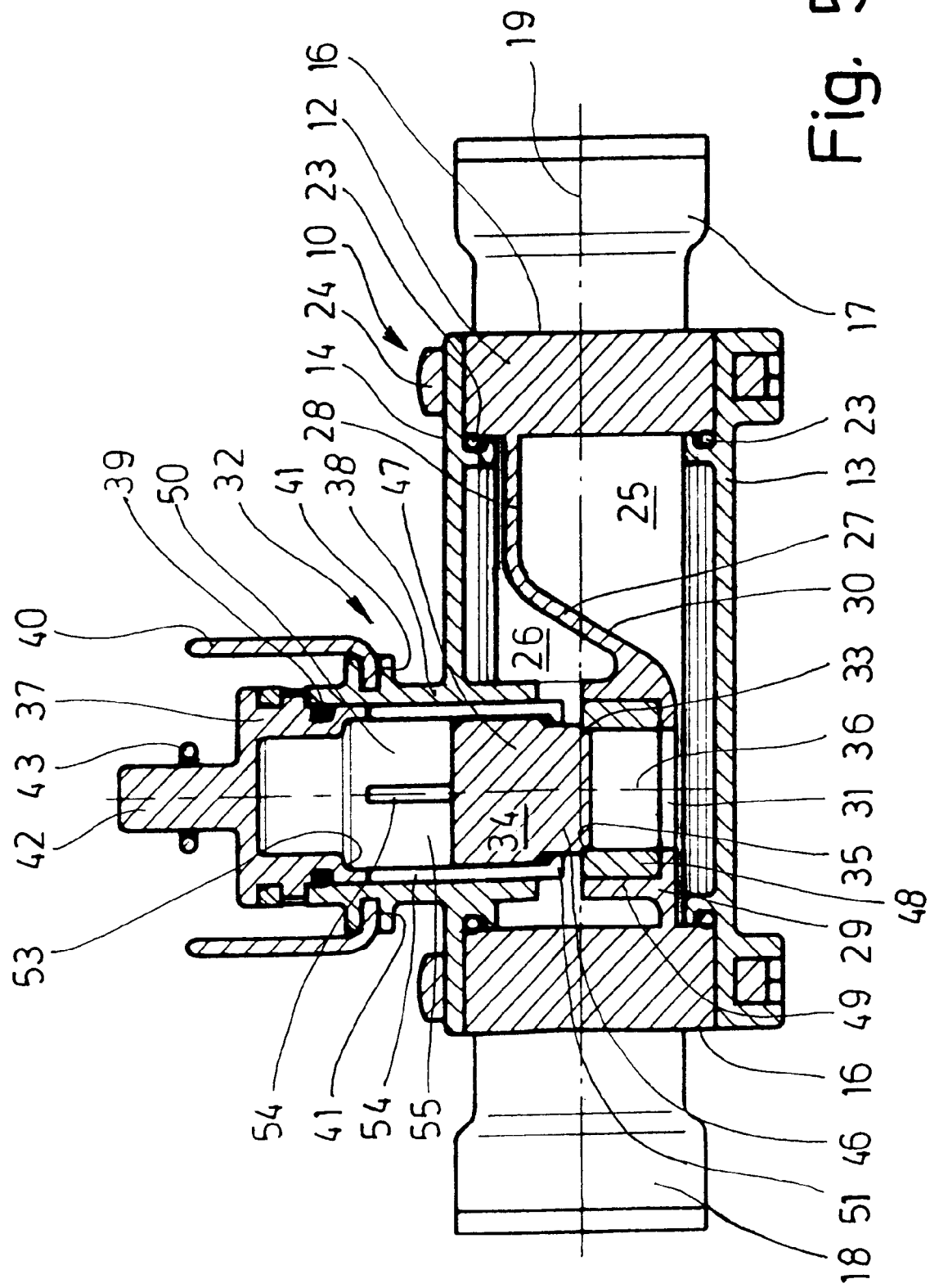
FIG. 5 shows a section V—V through the device.

An orifice 31 is located in the partition 27, specifically in the wider edge portion 29. This orifice 31 is assigned a valve arrangement 32 (FIG. 5). The orifice 31 can be opened or closed, as required, by means of the valve arrangement 32. Correspondingly, an inflow of water out of the chamber 25 connected to the water inflow connection piece 17 to a chamber 26 connected to the water outflow connection piece 18 is interrupted or released. If required, a plurality of orifices 31 and valve arrangements 32 may also be provided.

The valve arrangement 32 has a valve seat 33, assigned to the orifice 31 in the partition 27, and a valve pin 34 capable of being moved up and down and having a sealing surface 35 matching the valve seat 33. The elongate valve pin 34 is capable of being moved up and down on a vertical longitudinal mid-axis 36. The valve arrangement 32, specifically, in particular, the valve pin 34, is assigned to the top side of the partition 27, said top side facing the chamber 26 for outflowing water.

Figure 1:
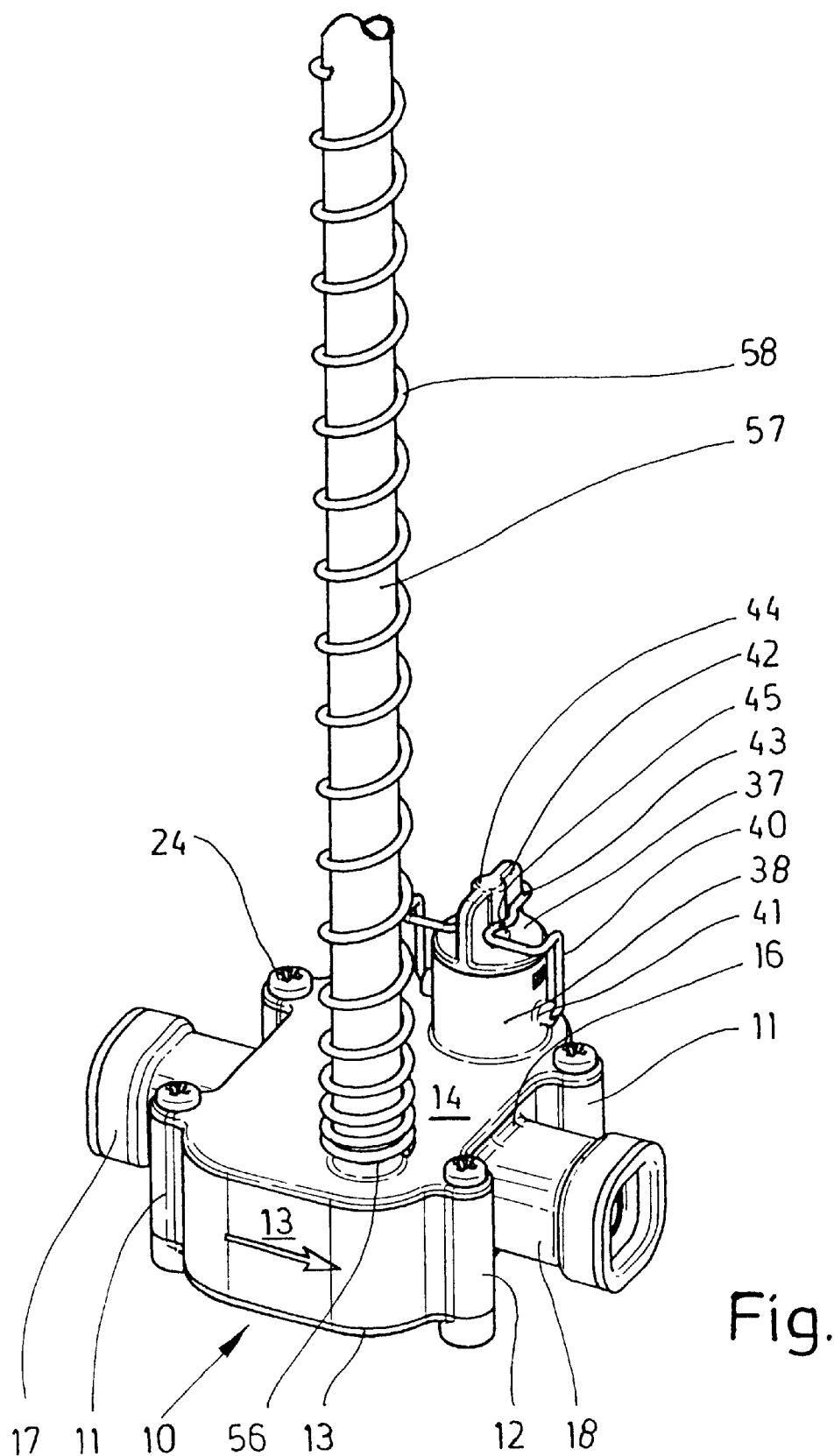
FIG. 1 shows a perspective illustration of the device.

The valve pin 34 is guided so as to be capable of being moved up and down in a cylindrical insert part 37. The insert part 37 thereby forms for the valve pin 34 a guide which, in the exemplary embodiment shown, is cylindrical. The insert part 37, in turn, is arranged releasably in a sleeve 38. The sleeve 39 is connected to the cover plate 14, specifically, in the exemplary embodiment shown, in one piece. The sleeve 38 projects with a smaller part into the chamber 26 inside the housing 10, whilst a larger part of the sleeve 38 projects upwards relative to the cover plate 14. The insert part 37 has a continuous sealing ring 39, by means of which it is sealed off relative to the sleeve 38. That part of the sleeve 38 which projects upwards relative to the cover plate 14 is assigned a securing shackle 40. The latter is mounted pivotably about a horizontal axis at two opposite bearing points 41 on the outside of the sleeve 38. In a closing position, the securing shackle 40 rests against the top side of the insert part 37 and thus holds the latter in the inserted position in the sleeve 38. A flat grip 42 projecting relative to the top side of the insert part 37 is partially surrounded by a U-shaped protuberance 43 of the securing shackle 40, with the result that the insert part 37 is held essentially non-rotatably in the sleeve 38. The grip 42 has, in the middle, a cylindrical widening 44 which matches corresponding shaped-out portions 45 in the protuberance 43 of the securing shackle 40 and thereby forms a latching connection of the securing shackle 40 in the position in which the latter secures the insert part 37 in the sleeve 38 (FIG. 1).

The valve pin 34 is of rotationally symmetrical, to be precise cylindrical design. It is composed of two cylinder portions 46 of different diameters. A lower cylinder portion 46 has a smaller diameter than an upper cylinder portion 47 which is located above it and of which the length, in the exemplary embodiment shown, corresponds approximately to twice the length of the lower (smaller) cylinder portion 46. With the valve arrangement 32 closed, the valve pin 34 projects with a larger part of the lower cylinder portion 46 downwards out of the insert part 37. A lower end region of the cylinder portion 46 of smaller diameter is provided with a continuous frustoconical bevel which forms the frustoconical sealing surface 35. This sealing surface 35 matches a correspondingly formed, likewise frustoconical valve seat 33 in the region of the orifice 31 in the partition 27. The frustoconical valve seat 33 is arranged continuously at the upper inner edge of an insert sleeve 48. The insert sleeve 48 is inserted, water-tight, in a cylindrical recess of a continuous collar 49 of the partition 27. The collar 49 is assigned to that side of the partition 27 facing the upper chamber 26 and surrounds the orifice 31 in the partition 27.

The valve pin 34 is guided with its upper cylinder portion 47 (of larger diameter) so as to be capable of being moved up and down in a downwardly open blind-hole bore 50 in the insert part 37. The blind-hole bore 50 has a continuous contraction 51 at the lower end. As a result, the inside diameter of the blind-hole bore 50 is contracted at the lower end of the insert part 37, specifically approximately to the smaller diameter of the lower cylinder portion 46. The dimensions of the valve arrangement 32 are such that, when the latter is in the closed state, the frustoconical sealing surface 35 at the lower end of the valve pin 34 can come into bearing contact over the entire area with the likewise frustoconically formed valve seat 33 on the upper inner face of the insert sleeve 48, that is to say, with the valve arrangement 32 closed, a large-area frustoconical seal is provided between the insert sleeve 48 and the valve pin 34. In this case, a step 52 between the cylinder portions 46 and 47 of the valve pin 34, which have different diameters, does not rest against the contraction 51 at the lower end of the blind-hole bore 50 in the insert part 37 (FIG. 5). The length of that cylinder portion of the blind-hole bore 50 which guides the upper (larger) cylinder portion 47 of the valve pin 34 in the insert part 37 is substantially greater than the length of the upper cylinder portion 47. In the exemplary embodiment shown, the cylindrical guide portion of the blind-hole bore 50 is approximately twice as long as the upper cylinder portion 47 of the valve pin 34. As a result, particularly for scavenging the device, the valve pin 34 can penetrate completely, that is to say with the entire lower cylinder portion 46, into the blind-hole bore 50 of the insert part 37. Moreover, the blind-hole bore 50 of the insert part 37 affords sufficient space for receiving longer valve pins 34.

With the insert part 37 pulled out of the sleeve 38, the valve pin 34 is secured in said insert part against falling out by the contraction 51 of the lower end of the blind-hole bore 50. Likewise, the maximum push-in depth of the valve pin 34 in the insert part 37 is limited by a continuous step 53 in the end region of the blind-hole bore 50.

A part-region of the insert part 37 is provided with longitudinally directed slots 54. In the exemplary embodiment shown, four slots 54 distributed uniformly over the circumference of the insert part 37 are provided. The slots 54 of equal size emanate from the open underside of the insert part 37 and extend to just short of the upper step 53 of the blind-hole bore 50.

Transitional regions of the insert part 36 which are located within adjacent slots 54 can be widened elastically as a result of the slots 54, to be precise form spring tongues 55. It is thereby possible to widen the lower contraction 51 of the blind-hole bore 50 of the insert part 37 in such a way that, by virtue of the elastic widening of the spring tongue 55, the valve pin 34 can be pulled with its cylinder portion 47 of larger diameter out of the insert part 37 and, if appropriate, inserted again. When the insert part 37, together with the valve pin 34, is inserted in the sleeve 38 of the housing 10, the sleeve 38 holds the spring tongues 55 of the insert part 37 together, so that, with the valve arrangement 32 mounted, the valve pin 34 is held positively in the insert part 37.

An attachment connection piece 56 branches off from the upper chamber 26 for the outflowing liquid. The attachment connection piece 56 is connected in one piece to the cover plate 14 of the housing 10. A lower region of an elongate vertical tube 57 is pushed onto the attachment connection piece 56. The tube 57 serves for bleeding the drinking appliance. A spring 58 surrounding the tube 57 on the outside serves for stabilizing the tube 57 and for protecting the latter against kinking. The tube 57 is formed preferably from transparent plastic, with the result that the water level in the tube 57 is visible and the pressure in the drinking appliance can thereby be determined visually. The upper open end of the tube 57 may be provided with a valve, not shown. This valve is capable of being closed when the drinking appliance is to be scavenged at higher pressure.

The device consists essentially of plastic. This applies, above all, to the housing 10. By contrast, the valve pin 34 and the insert sleeve 48 are formed from a metallic material, in particular stainless steel. As a result, the surfaces serving for sealing the valve arrangement 32 consists of a resistant material capable of being accurately machined.

The method according to the invention for changing the pressure compensation ratio of the above-described device (gradient controller) proceeds as follows:

To be precise, since the valve 34, by the force of its own weight, opens and closes the valve arrangement 32, in order to set the appropriate pressure compensation ratio, the difference in pressure in the chamber 25 having the water inflow connection piece 17 in relation to the chamber 26 having the water outflow connection piece 18 must be coordinated with the inclination of the water supply conduit. A water supply conduit having a greater inclination requires a heavier valve pin 34 than a water supply conduit inclined to a lesser extent. For carrying out an appropriate setting, a valve pin 34 of appropriate weight is inserted in the insert part 37. The valve pins 34 of different weight have upper cylinder portions 47 of different length. The length of the lower cylinder portion 46 of smaller diameter usually remains unchanged.

When a valve pin 34 is to be exchanged for another, then, first the securing shackle 40 is pivoted to the side, so that it frees the grip 42 of the insert part 37. The insert part 37, together with the valve pin 34, can then be pulled upwards out of the sleeve 38. After the insert part 37, together with the valve pin 34, is separated from the device, the valve pin 34 is pulled out of the insert part 37, the spring tongues 55 separated by the slots 54 being bent outwards due to elastic deformation. At the same time, the contraction 51 at the lower end of the insert part 37 widens to an extend such that the valve pin 34 can be pulled downwards with the upper cylinder portion 47 of larger diameter out of the insert part 37. Another valve pin 34 can then be pushed from below into the insert part 37, the spring tongues 55 undergoing elastic deformation. By the spring tongues 55 subsequently being drawn together into the initial position, the valve pin 34 is secured against falling out of the insert part 37 by the contraction 51.

By giving the length of the blind-hole bore 50 in the insert part 37 an appropriate dimension which is greater than is necessary for opening the valve arrangement 32, it is possible for the insert part 37 to be assigned valve pins 34 of different length. In this case, the maximum length of the blind-hole bore 50 in the insert part 37 is selected such that the valve pin 34 having the greatest length is still capable of being moved up and down in the insert part 37 to a sufficient extent to open the valve arrangement 32, specifically also for when the drinking appliance is scavenged. As a rule, the length of the blind-hole bore 50 is dimensioned such that the longest valve pin 34 is capable of being moved into the insert part 37 to an extend such that it is located completely in the latter.

In an alternative embodiment of the method, there is provision for exchanging the insert part 37, together with the respective valve pin 34, as a complete unit. In this case, it is not necessary to separate the valve pin 34 from the insert part 37 after the insert part 37 has been pulled out of the housing 10. In this embodiment of the invention, if appropriate, the slots 54 of the cylindrical outer surface of the insert part 37 may be dispensed with, so that the guide for the valve pin 34 is completely cylindrical and has no spring tongues 55.

A device according to a second exemplary embodiment (not shown) of the invention differs from the above-described device in the valve arrangement 32. The valve arrangement in the device to be described here also has a valve pin. However, the latter is accommodated completely in an insert sleeve, specifically in such a way that it is capable of being moved up and down in the latter. The insert sleeve is fixedly arranged with a lower part in the collar of the partition.

The insert sleeve is stepped on the inside, to be precise has two different diameters there. An upper part of the insert sleeve having a larger diameter serves for receiving the valve pin. A lower part of the insert sleeve which approximately has the height of the collar has a smaller diameter. Located at the transition between the smaller and larger diameter is a preferably conical valve seat. The latter matches a sealing surface at the lower end of the valve pin, the valve pin resting sealingly with its sealing surface on the valve seat for the purpose of closing the valve arrangement.

A plurality of passage bores are arranged above the valve seat in the wall of the insert sleeve. Preferably, approximately four to eight passage bores of the same size are arranged so as to be distributed uniformly over the circumference of the outer surface of the insert sleeve. With the valve arrangement open, that is to say with the valve pin moved up, the water passes via the lower open end face of the insert sleeve into the interior of the latter and flows radially outwards, specifically approximately in the horizontal direction, through the passage bores in the outer surface of the insert sleeve which are completely or for the most part released by the valve pin.

In the device shown here, an upper part of the insert sleeve extends into a sleeve-like widening of the cover plate of the housing. This sleeve is designed to have a diameter larger than the outside diameter of the insert sleeve, so as to allow for, between the sleeve and the insert sleeve, an annular gap through which water can pass to the top side of the valve pin. The top side of the sleeve can be closed sealingly by means of a closure. By the cover being removed, the valve pin in the insert sleeve becomes accessible. In order to change the pressure compensation ratio, the valve pin can then be exchanged for another valve pin, in particular a heavier or lighter valve pin. After this exchange, the top side of the sleeve can be sealingly closed again by means of the closure on the cover plate.

What is claimed is:

1. Device for compensating the pressure of a liquid in a liquid conduit of an animal drinking trough, with a housing which is capable of being inserted into the liquid conduit and in which chambers for inflowing liquid and for outflowing liquid are located, at least one valve arrangement being arranged between the chambers separated by a partition, characterized in that the valve arrangement (32) has at least one valve pin (34) which by its own weight closes the valve arrangement (32).

2. Device according to claim 1, characterized in that the valve arrangement (32) is assigned to the chamber (26) for outflowing liquid.

3. Device according to claim 2, characterized in that the valve pin (34) has a conical sealing surface (35).

4. Device according to claim 3, characterized in that the conical sealing surface (35) is arranged at a lower end of the valve pin (34).

5. Device according to claim 1, characterized in that the valve pin (34) has a conical sealing surface (35).

6. Device according to claim 5, characterized in that the conical sealing surface (35) is arranged at a lower end of the valve pin (34).

7. Device according to claim 1, characterized in that the partition (27) has arranged in it an orifice (31) which has a valve seat (33) for the respective valve arrangement (32).

8. Device according to claim 7, characterized in that the valve seat (33) has a conical design and matches the sealing surface (35) of the valve pin (34).

9. Device according to claim 1, characterized in that the valve pin (34) is mounted so as to be capable of being moved up and down in an elongate guide in the housing (10).

10. Device according to claim 9, characterized in that the guide for the valve pin (34) in the housing (10) is greater than the length of the valve pin (34).

11. Device according to claim 9, characterized in that the valve pin (34) is secured in the guide against falling out in at least one axial direction.

12. Device for compensating the pressure of a liquid in a liquid conduit of an animal drinking trough, with a housing which is capable of being inserted into the liquid conduit and in which chambers for inflowing liquid and for outflowing liquid are located, at least one valve arrangement being arranged between the chambers separated by a partition, characterized in the valve arrangement (32) has at least one valve pin (34) which by its own weight closes the valve arrangement (32), the valve seat (33) has conical design and matches the sealing surface (35) of the valve pin (34), and the conical valve seat (33) is assigned to a separated insert which is arranged in the orifice (31) of partition (27).

13. Device according to claim 12, characterized in that the insert for forming the valve seat (33) and the valve pin (34) are formed from a stainless steel.

14. Device for compensating the pressure of a liquid in a liquid conduit of an animal drinking trough, with a housing which is capable of being inserted into the liquid conduit and in which chambers for inflowing liquid and for outflowing liquid are located, at least one valve arrangement being arranged between the chambers separated by a partition, characterized in that the valve arrangement (32) has at least one valve pin (34) which by its own weight closes the valve arrangement (32), the valve pin (34) is mounted so as to be capable of being moved up and down in an elongate guide in the housing, and the guide for the valve pin (34) is designed as a sleeve-like insert part (37) which is mounted in a matching sleeve (38) of housing (10).

15. Device according to claim 14, characterized in that the sleeve (38) is assigned to a cover of the housing (10).

16. Device according to claim 14, characterized in that the insert part (37) is sealed off relative to the sleeve (38) of the housing (10).

17. Device according to claim 14, characterized in that the insert part (37) is capable of being detained in the sleeve (38) by means of a releasable closure.

18. Device according to claim 14, characterized in that the insert part (37), together with the valve pin (34), can be taken out of the sleeve (38) of the housing (10) and can be inserted therein.

19. Device according to claim 14, characterized in that the valve pin (34) is held in the insert part (37) against falling out.

20. Device according to claim 14, characterized in that the valve pin (34) can be taken out of the insert part (37).

21. Device according to claim 20, characterized in that the insert part (37) has spring tongues (55) which, by undergoing elastic deformation, allow the valve pin (34) to be taken out of and reinserted into the insert part (37).

22. Method for changing the pressure compensation ratio in an inclined liquid conduit, the pressure of the inflowing liquid being changed to a lower pressure for outflowing liquid by means of a valve arrangement having a valve body, characterized in that the valve body which by its own weight actuates the valve arrangement (32) is exchanged, as required, for a valve body having a different own weight.

23. Method for changing the pressure compensation ratio in an inclined liquid conduit, the pressure of the inflowing liquid being changed to a lower pressure for outflowing liquid by means of a valve arrangement having a valve body, characterized in that the valve body which by its own weight actuates the valve arrangement (32) is exchanged, as required, for a valve body having a different own weight and in that the valve body is exchanged together with an insert part (37).

24. Method according to claim 23, characterized in that an exchange of the valve body is carried out, with the insert part (37) taken out of the sleeve (38).

25. Method for changing the pressure compensation ratio in an inclined liquid conduit, the pressure of the inflowing liquid being changed to a lower pressure for outflowing liquid by means of a valve arrangement having a valve body, characterized in that the valve body which by its own weight actuates the valve arrangement (32) is exchanged, as required, for a valve body having a different own weight and in that an insert part (37), together with the valve body, is inserted sealingly into a sleeve (38) of a housing (10) receiving the valve arrangement.

26. Device for compensating the pressure of a liquid conduit of an animal drinking trough, with a. a housing which can be inserted into the liquid conduit and in which chambers for inflowing liquid and for outflowing liquid are located;

b. a partition for separating the chambers that has at least one partition section which runs horizontally and in which an opening is arranged;

c. a valve arrangement assigned to the opening of the partition section, said valve arrangement having at least one valve pin which can be moved up and down along its longitudinal axis for closing the valve arrangement by the own weight of the valve pin; and d. a guide, connected to the housing and perpendicular to the horizontal partition section, which is configured such that the valve pin is retained in the guide and can be moved up and down.

* * * * *